United States Patent
Zhang et al.

(10) Patent No.: US 9,020,874 B2
(45) Date of Patent: Apr. 28, 2015

(54) SHORT-TERM LOAD FORECAST USING SUPPORT VECTOR REGRESSION AND FEATURE LEARNING

(71) Applicant: Siemens Corporation, Iselin, NJ (US)

(72) Inventors: Kai Zhang, Princeton, NJ (US); Fabian Moerchen, Rocky Hill, NJ (US); Amit Chakraborty, East Windsor, NJ (US)

(73) Assignee: Siemens Aktiengesellschaft, Munich (DE)

( * ) Notice: Subject to any disclaimer, the term of this patent is extended or adjusted under 35 U.S.C. 154(b) by 302 days.

(21) Appl. No.: 13/661,339

(22) Filed: Oct. 26, 2012

(65) Prior Publication Data

US 2013/0110756 A1 May 2, 2013

Related U.S. Application Data

(60) Provisional application No. 61/553,487, filed on Oct. 31, 2011.

(51) Int. Cl.
*G06F 17/00* (2006.01)
*G06N 5/02* (2006.01)
*G06N 99/00* (2010.01)
*G06K 9/62* (2006.01)

(52) U.S. Cl.
CPC ............ *G06N 99/005* (2013.01); *G06K 9/6269* (2013.01)

(58) Field of Classification Search
USPC .......................................................... 706/46
See application file for complete search history.

(56) References Cited

U.S. PATENT DOCUMENTS

| | | | |
|---|---|---|---|
| 6,246,972 B1 | 6/2001 | Klimasauska | |
| 7,889,898 B2 * | 2/2011 | Chakraborty et al. | ........ 382/128 |
| 7,930,198 B2 * | 4/2011 | Yin et al. | ...................... 705/7.12 |
| 7,945,390 B2 * | 5/2011 | Chakraborty et al. | .......... 702/19 |
| 8,014,616 B2 * | 9/2011 | Chakraborty et al. | ........ 382/233 |
| 8,396,572 B2 * | 3/2013 | Torzhkov et al. | ............... 700/29 |
| 8,423,493 B2 * | 4/2013 | Moerchen et al. | .............. 706/45 |
| 8,527,251 B2 * | 9/2013 | Ionasec et al. | ................... 703/11 |
| 8,527,351 B2 * | 9/2013 | Wiles | .......................... 705/14.69 |
| 8,645,311 B2 * | 2/2014 | Lahiri et al. | ..................... 706/58 |
| 8,719,194 B2 * | 5/2014 | Qin et al. | ......................... 706/12 |
| 8,886,574 B2 * | 11/2014 | Yuan et al. | ...................... 706/12 |
| 2009/0216742 A1 | 8/2009 | Zima et al. | |
| 2011/0151346 A1 | 6/2011 | Kaneko et al. | |
| 2011/0218727 A1 | 9/2011 | Cesario et al. | |

OTHER PUBLICATIONS

Power load forecasting using adaptive fuzzy inference neural networks, Kodogiannis, V.S. ; Petrounias, I. Intelligent Systems (IS), 2012 6th IEEE International Conference DOI: 10.1109/IS.2012.6335142 Publication Year: 2012 , pp. 238-243.*

(Continued)

*Primary Examiner* — Michael B Holmes

(57) ABSTRACT

In a support vector regression approach to forecasting power load in an electrical grid, a feature learning scheme weights each feature in the input data with its correlation with the predicted load, increasing the prediction accuracy. The kernel matrix for the input training data is computed such that features that align better with the target variable are given greater weight. The resulting load forecast may be used to compute commands sent to demand response modules.

20 Claims, 7 Drawing Sheets

(56) References Cited

OTHER PUBLICATIONS

An Empirical Research on Short Term Power Load Forecasting Based on Chaos Theory, Herui Cui ; Xiuli Song Future Information Technology and Management Engineering, 2008. FITME '08. International Seminar on DOI: 10.1109/FITME.2008.21 Publication Year: 2008 , pp. 394-397.*

Credibility assessment of short-term load forecast in power system, Zhikun Zhang ; Canbing Li ; Yijia Cao ; Liangxing Tang ; Junxiong Li ; Bo Wu Innovative Smart Grid Technologies—Asia (ISGT Asia), 2012 IEEE DOI: 10.1109/ISGT-Asia.2012.6303209 Publication Year: 2012 , pp. 1-5.*

Multiregion Short-Term Load Forecasting in Consideration of HI and Load/Weather Diversity, Chu, W.-C. ; Yi-Ping Chen ; Zheng-Wei Xu ; Wei-Jen Lee Industry Applications, IEEE Transactions on vol. 47 , Issue: 1 DOI: 10.1109/TIA.2010.2090440 Publication Year: 2011 , pp. 232-237.*

Short Term Load Forecasting Using an Artificial Neural Network Trained by Artificial Immune System Learning Algorithm Abdul Hamid, M.B. ; Abdul Rahman, T.K. Computer Modelling and Simulation (UKSim), 2010 12th International Conference on DOI: 10.1109/UKSIM.2010.82 Publication Year: 2010 , pp. 408-413.*

Elattar et al., "Electric Load Forecasting Based on Locally Weighted Support Vector Regression", IEEE Transactions on Systems, Man and Cybernetics, Part C: Applications and Reviews, vol. 40, No. 4, Jul. 2010.

Chen et al., "Load Forecasting using Support Vector Machines: A Study on EUNITE Competition 2011", European Network on Intelligent Technologies for Smart Adaptive Systems, Dec. 2001.

International Search Report dated Jun. 4, 2013.

* cited by examiner

SHORT-TERM LOAD FORECAST USING SUPPORT VECTOR REGRESSION AND FEATURE LEARNING

CLAIM OF PRIORITY

This application claims priority to, and incorporates by reference herein in its entirety, U.S. Provisional Patent Application Ser. No. 61/553,487, filed Oct. 31, 2011, and entitled "Short-Term Load Forecast Using Support Vector Regression and Feature Learning."

FIELD OF THE INVENTION

This invention relates generally to short-term load forecasting of electrical power use, and more particularly to methods, systems and computer readable media for learning features for use in a support vector regression approach to forecasting.

BACKGROUND OF THE INVENTION

Tracking system load is a basic requirement in the operation, maintenance, efficient scheduling and control of power systems. In particular, with the development of a smart grid that allows power producers and users to respond intelligently to the actual system and market conditions, load forecasting is becoming more and more important. First, it provides useful information for reducing the cost. In many daily operations of the power factory, such as unit commitment, economical dispatch, and automatic general control, knowing the system load up to a short time span in the future is crucial to taking actions. Second, it can facilitate decision and management. Knowing the maximum system load can help maintenance scheduling and hydro-thermal coordination. Third, it can guarantee secure and uninterrupted power supply for energy commercialization.

SUMMARY OF THE INVENTION

The present invention addresses the needs described above by providing a method for forecasting short term power system load in a power supply system. In the method, for a plurality of input features, a plurality of respective correlation scores are computed using training data, each correlation score representing a strength of correlation between an input feature and the power system load. Using the training data, a kernel matrix is computed, the kernel matrix defining mappings of the plurality of input features for use in a non-linear support vector regression framework, the kernel matrix including a weighting of each of the plurality of input features using the respective correlation scores. The short term power system load forecast is then computing from a set of input data, using the non-linear support vector regression framework.

In another aspect of the invention, a method is provided for reducing peak system power load using a demand response module. For a plurality of input features, a plurality of respective correlation scores are computed using training data, each correlation score representing a strength of correlation between an input feature and the power system load. Using the training data, a kernel matrix is computed, defining mappings of the plurality of input features for use in a non-linear support vector regression framework, the kernel matrix including a weighting of each of the plurality of input features using the respective correlation scores. A short term power system load forecast is then computed from a set of input data, using the non-linear support vector regression framework. Demand response module instructions are then transmitting for reducing peak system power load in accordance with the short term power system load forecast.

In another aspect of the invention, a non-transitory computer-usable medium is provided having computer readable instructions stored thereon for execution by a processor to perform methods for forecasting short term power system load in a power supply system as described above.

DESCRIPTION OF THE INVENTION

Various approaches have been proposed for load forecasting, including artificial neural networks, support vector regression, nonparametric regression, autoregressive models and fuzzy logic networks. The present disclosure focuses on the support vector regression approach due to its accuracy and efficiency in practical prediction problems. A novel feature learning scheme is described, that weights each feature in the input data with its correlation with the predicted load, which can improve the prediction accuracy compared with treating each feature equally importantly.

Support Vector Regression

Support vector regression is a flexible regression framework based on the kernel mapping and maximum margin criteria. Given set of multidimensional samples $(x_1, y_1), (x_2, y_2), \ldots, (x_n, y_n)$, support vector regression attempts to estimate the relation between $x_i$'s and $y_i$'s through the following function $$f(x) = w^\Phi(x) + b,$$

where $\Phi(x)$ is the feature mapping in the kernel space induced by the kernel function $K(\cdot,\cdot)$ that satisfies the kernel trick $$\langle \phi(x_1), \phi(x_2) \rangle = K(x_1, x_2).$$

By using the nonlinear kernel map $\phi(x)$, linear algorithms can be performed in the nonlinear space, which improves the modeling powers of the model. The primal form of support vector regression is as follows:

$$\min \frac{1}{2}\|w\|^2 + C\sum_{i=1}^{n}(\xi_i + \xi_i^*) \text{ s.t. } y_i - w'\varphi(x_i) - b \le \epsilon + \xi_i$$

$$w'\varphi(x_i) + b - y_i \le \epsilon + \xi_i^*.$$

Figure 1:
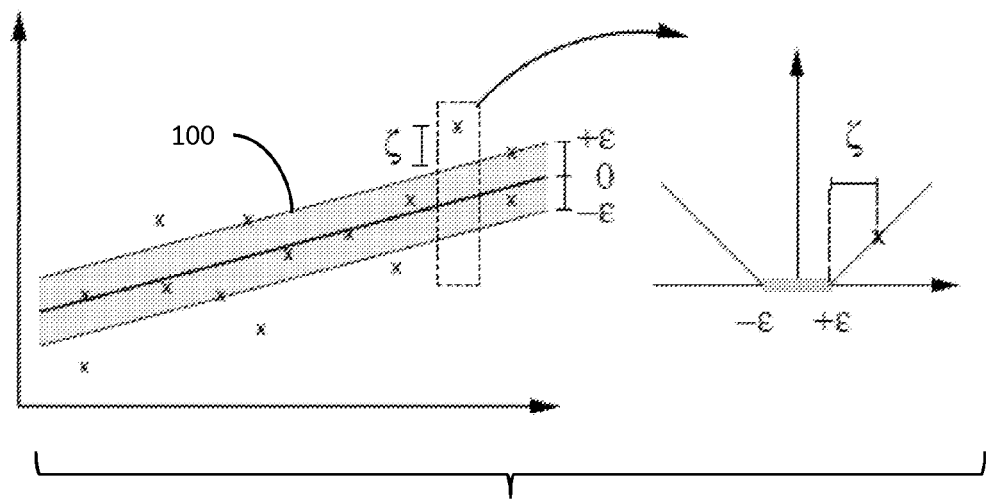
FIG. 1 is a graphical representation of a support vector regression analysis used in embodiments of the invention.

As demonstrated by the graphical representation of a support vector regression implementation 100 of FIG. 1, the ϵ-sensitive loss function is used such that errors that are larger than ϵ will not induce a loss term, which can guarantee a sparsity of solutions. By using the Lagrangian technique, the dual form of the support vector regression is obtained as a standard quadratic programming problem:

$$\max -\frac{1}{2}\sum_{i,j} =$$

$$1^n(\alpha_i - \alpha_j^*)(\alpha_i - \alpha_j^*)K(x_i, x_j) - \epsilon\sum_{i=1}^{n}(\alpha_i + \alpha_i^*) + \sum_{i=1}^{n}y_i(\alpha_i - \alpha_i^*)$$

$$\text{s.t. } \sum_{i=1}^{n}(\alpha_i + \alpha_i^*) = 0, \alpha_i, \alpha_i^* \in [0, C].$$

The primal variables can be recovered by the dual variables $\alpha_i$'s and $\alpha_i^*$'s as follows:

$$w = \sum_{i=1}^{n}(\alpha_i - \alpha_i^*)\varphi(x_i),$$

and the decision function can be obtained as $$f(x) = \sum_{i=1}^{n}(\alpha_i - \alpha_i^*)K(x, x_i) + b.$$

In one embodiment, the Gaussian radial basis function (RBF) kernel $K(x_i, x_j) = \exp(-\|x_i - x_j\|^2/h^2)$ was used, which will map the data from the input space to an infinite-dimensional space. Empirically, the RBF kernel gives more accurate results compared with linear or polynomial kernels.

Embedding in the State Space

The support vector regression is designed for vectorial, multidimensional input data. In the context of time series prediction, the data must be transformed into such format. The state space embedding approach is applied to transform (multiple) time series into vectorial data suited for support vector regression. Starting from the simpler case of predicting the load y(t) based on the load history, a suitable window size Δ is chosen, and then the following data pairs are created:

$$\begin{bmatrix} y(1), y(2), \ldots, y(\Delta) \\ y(2), y(3), \ldots, y(\Delta+1) \\ \ldots \\ y(t), y(t+1), \ldots, y(t+\Delta) \\ y(t+1), y(t+2), \ldots, y(t+\Delta+1) \end{bmatrix} \begin{bmatrix} y(\Delta+1) \\ y(\Delta+2) \\ \ldots \\ y(\Delta+t+1) \\ y(\Delta+t+2) = ? \end{bmatrix}$$

where the left column is the training data and the right column is the target. In practice, there may be more than one time series whose evolution is informative to predicting a target time series. In that case, all the time series must be concatenated into one vectorial format.

Figure 2:
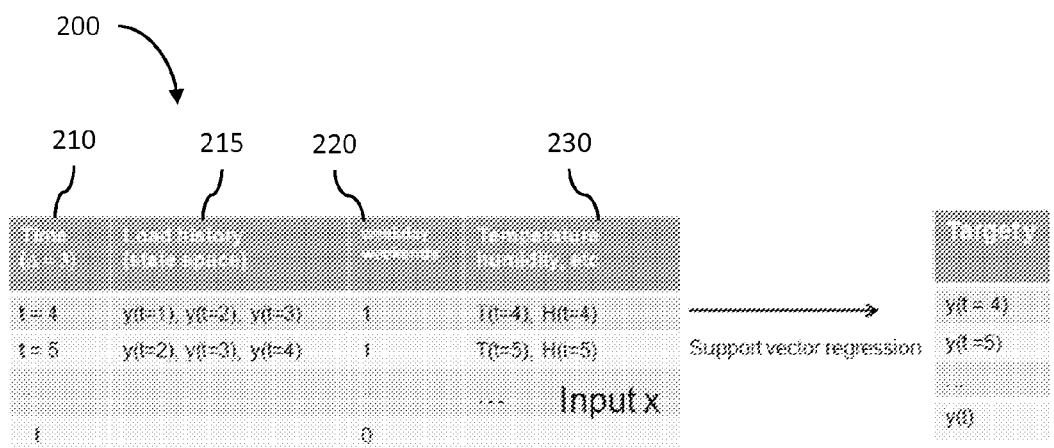
FIG. 2 is an example table showing the embedding of multiple time series into a state space to build training data for a support vector regression analysis in accordance with one embodiment of the invention.

The table 200 of FIG. 2 illustrates how multiple time series information is embedded into the state space to build up the training data for support vector regression. In the table 200, a window size 210 of Δ=3 is used. The date is coded as one feature 220 (weekday as 1, and weekend as 0); humidity and wind speed are also used as features 230. Among all the features, only the load history 215 is embedded in the 3-dimensional state space, while the other features/time series are simply used as they are. That is because the load history has already incorporated information about humidity, date nature, wind speed and their impact on the load consumption.

Feature Learning

In forecasting short-term load, there are a number of input features to be considered, including load history, temperature history, environmental factors like humidity, wind speed, air pressure, and so on. Those features form a multivariate input data group. Different features within the group may have different degrees of importance and varying impacts on the prediction results, and must therefore be scaled. Determining proper weight associated with each feature is crucial to good predictive performance of the support vector regression framework.

To optimally scale the input data, the presently disclosed technique uses a concept of "target alignment." Target alignment is defined as the strength of correlation between the input features and the target variable. Given that the input training data is $X \in R^{n \times d}$, whose ith feature is denoted by $X_{(:,i)}$, and that the target variable is denoted by $Y \in R_{n \times 1}$, the importance score for the ith feature is computed as $$f_i = |\langle X_{:,i}, Y \rangle|.$$

For two samples $x_i, x_j \in R^{D \times 1}$ the kernel matrix can then be computed as $$K(x_i, x_j) = \exp\left(-\frac{\sum_{d=1}^{D} f_d^2(x_i(d) - x_j(d))^2}{2h^2}\right).$$

By doing this, features that align better with the target variable are given greater weight in computing the kernel matrix, while irrelevant features are given diminished weight. That strategy is shown empirically to improve the generalization performance compared with treating all the features equally importantly.

EXPERIMENTAL RESULTS

Figure 3A:
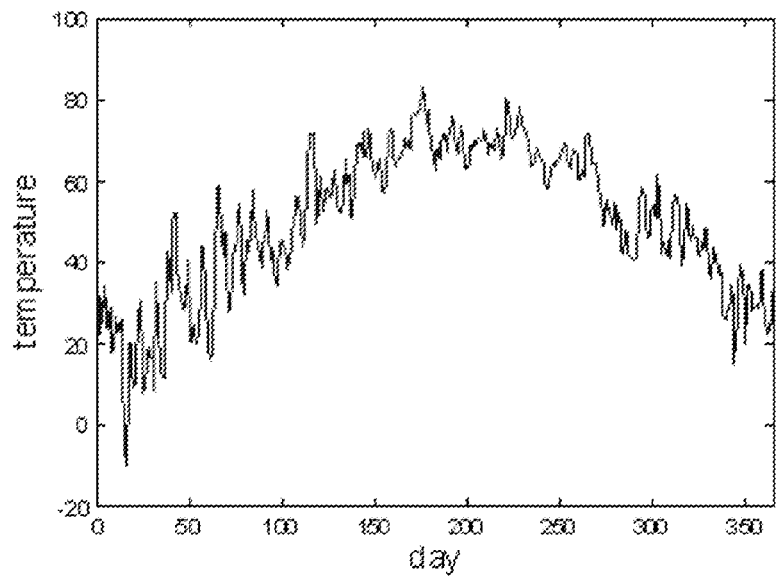
FIG. 3a is a plot showing daily temperatures in example data used to illustrate an embodiment of the invention.
Figure 3B:
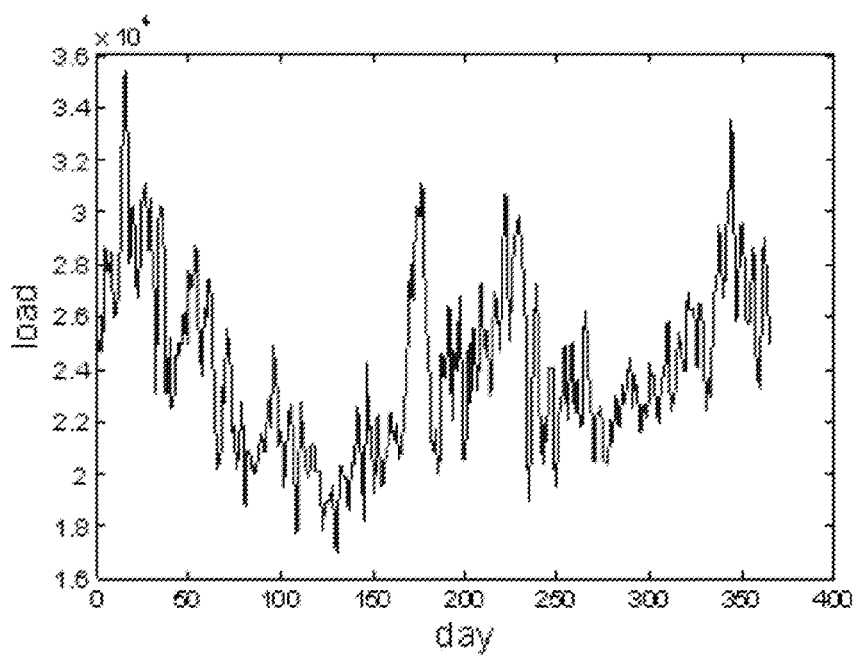
FIG. 3b is a plot showing daily load in example data used to illustrate an embodiment of the invention.
Figure 4:
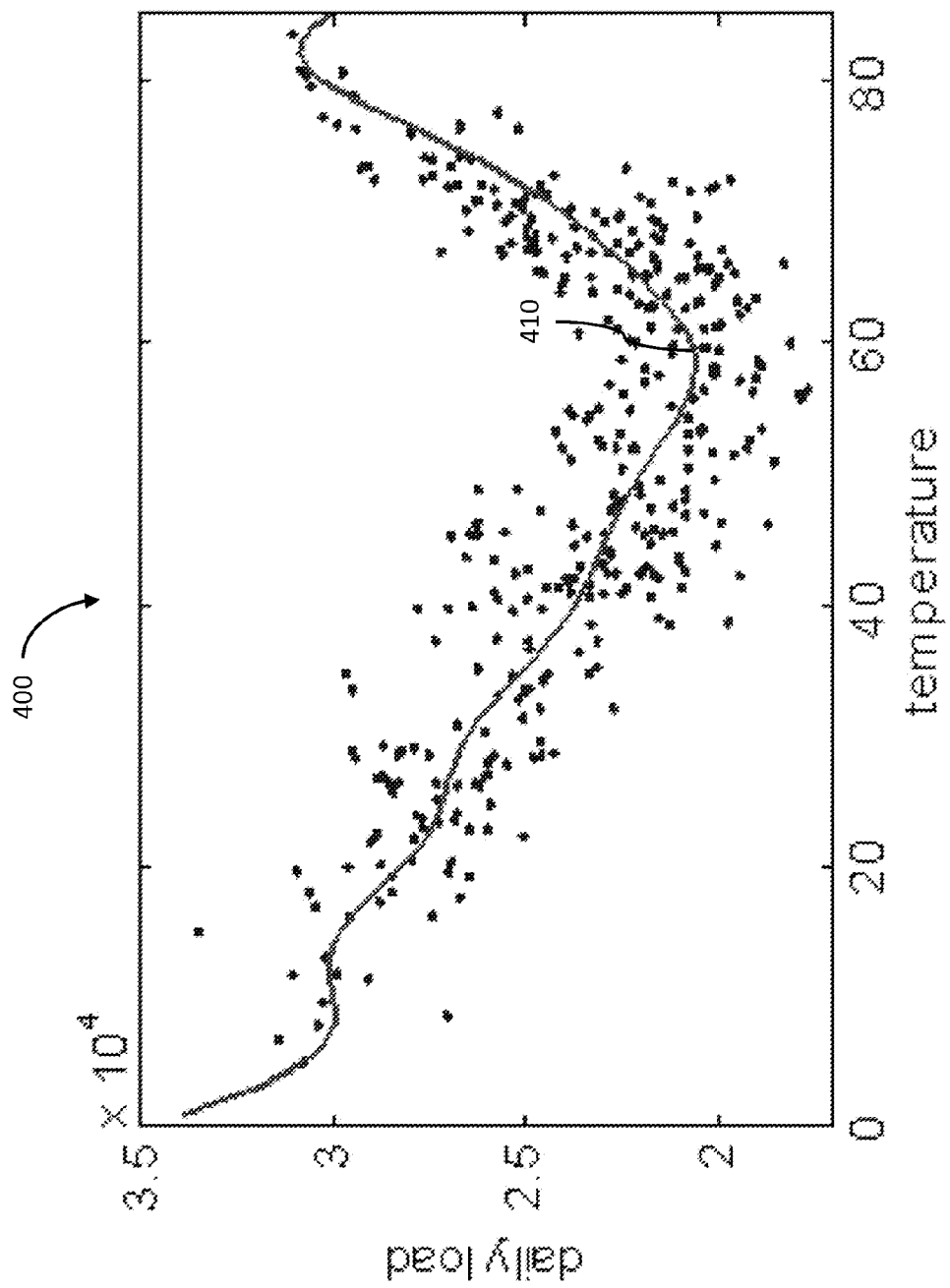
FIG. 4 is a plot showing daily temperature versus daily load in example data used to illustrate an embodiment of the invention.

This section summarizes empirical results obtained using the historical load data from the WABASH substation in western Indiana in the year 2009. The raw data contained the hourly load and was preprocessed to compute the daily load sum as the input data. Temperature data was also collected from several locations in the state and the average daily temperature was used as one of the input factors. In addition to temperature, humidity and wind speed were also used as input features. Daily temperature and daily load data for the WABASH substation data in the year 2009 are illustrated in FIGS. 3a and 3b, respectively. A scatterplot 400, shown in FIG. 4, represents the relationship between the load and the temperature. As can be seen, there is a clear causal relation between the two factors. When the temperature is around 60° F., the load consumption reaches a minimum 410 and when the temperature moves either lower or higher, the load consumption increases.

A kernel ridge regression was fit as follows. First, the input temperature was used to compute a kernel matrix with the Gaussian kernel function $K(x_i, x_j) = \exp(-|x_i - X_j|^2/h^2)$ here h is chosen as the averaged pairwise distance between samples.

Figure 5A:
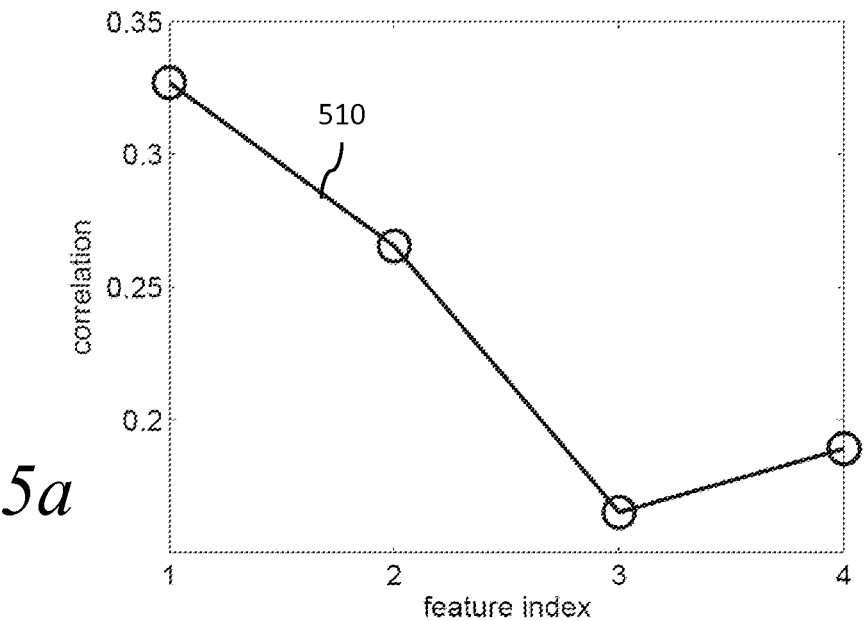
FIG. 5a is a plot showing correlation indices of several environmental features in accordance with one embodiment of the invention.
Figure 5B:
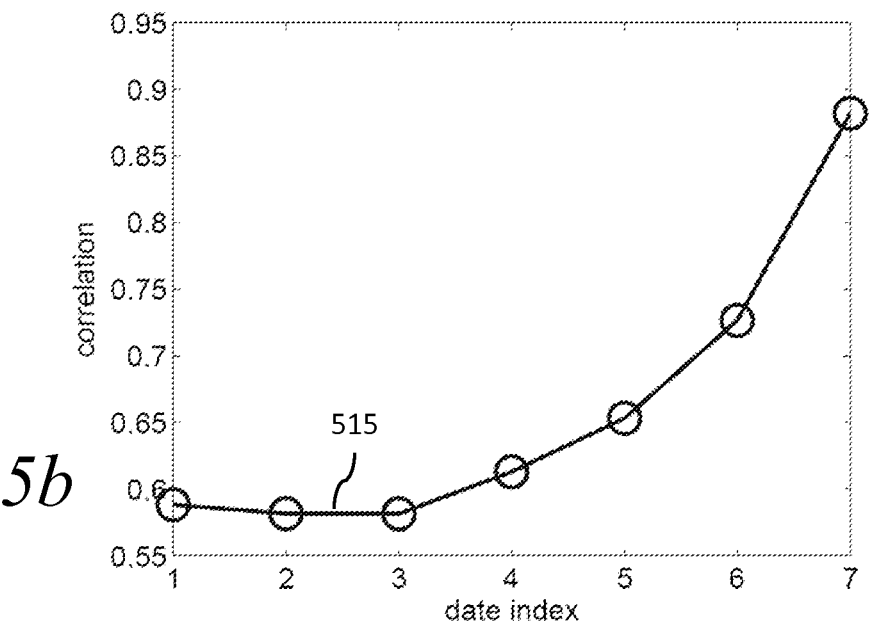
FIG. 5b is a plot showing correlation indices for seven prior days of load history in accordance with one embodiment of the invention.

Next, an examination was made of the correlation between the input features in the embedded state space and the target load, as shown in FIGS. 5a and 5b. The line 510 of FIG. 5a represents the correlation scores of the four environmental factors, namely, humidity, wind speed, dew point, and air pressure. As can be seen, the correlation score for the humidity is very high, which is related to the fact that more humidity will lead to more electricity cost in dryer machines; the humidity and the air pressure are also related to load consumption at a lower level. The dew point has the lowest correlation with the target load and therefore is given lowest weight in the support vector regression. The line 515 of FIG. 5b represents correlation score for Δ=7 days preceding the current date. As can be seen, the closer the date to the current, the greater the correlation. That means that more recent load history is a better predictor of future load consumption than less recent load history.

Figure 6:
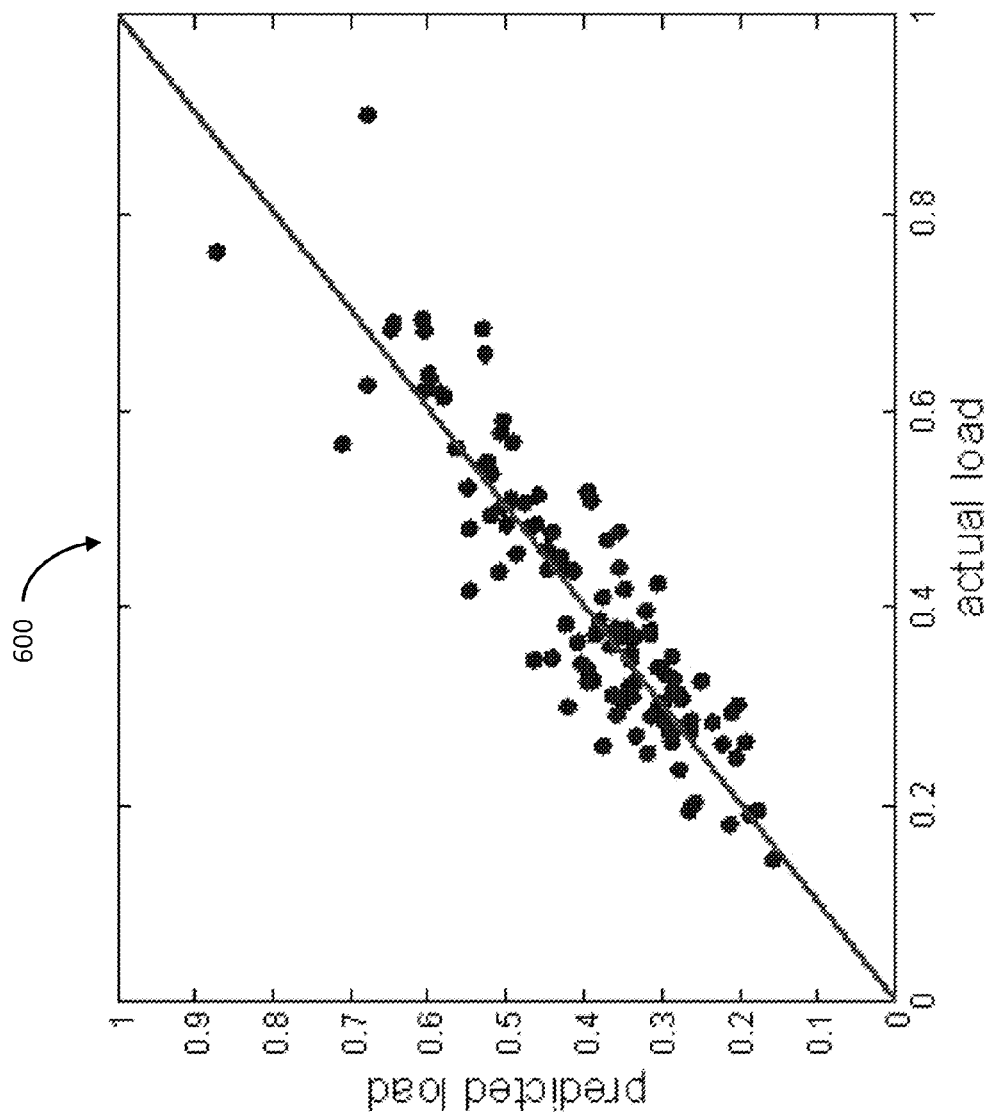
FIG. 6 is a plot showing predicted load versus actual load in an exemplary application of one embodiment of the invention.

A plot 600 of predicted load versus actual load for the WABASH substation during the period of December, 2009 is presented in FIG. 6. Data outside the subject period was used as the training data. As can be seen, there is a strong correlation between the prediction and actual load. Despite the limited amount of training data, the prediction accuracy is not as low as expected. The approach has been tested on benchmark data available from the EUNITE Competition 2001 (available at http://neuron.tuke.sk/competition/), where the averaged relative error is around 3.5% and approaches the reported results.

In Table 1 below, the results from using different feature re-weighting schemes in the support vector regression are compared. As can be seen, the prediction error using the adaptive, alignment based reweighting scores is lower than that of uniform weighting, which demonstrates the importance of assigning non-uniform weight to features in prediction problems.

TABLE 1

Mean Relative error (%) using different feature reweighting schemes of different algorithms.

| Feature Weighting Scheme | Mean Relative Error (%) |
|---|---|
| uniform weighting | 9.78 |
| target alignment | 8.46 |

Method

Figure 7:
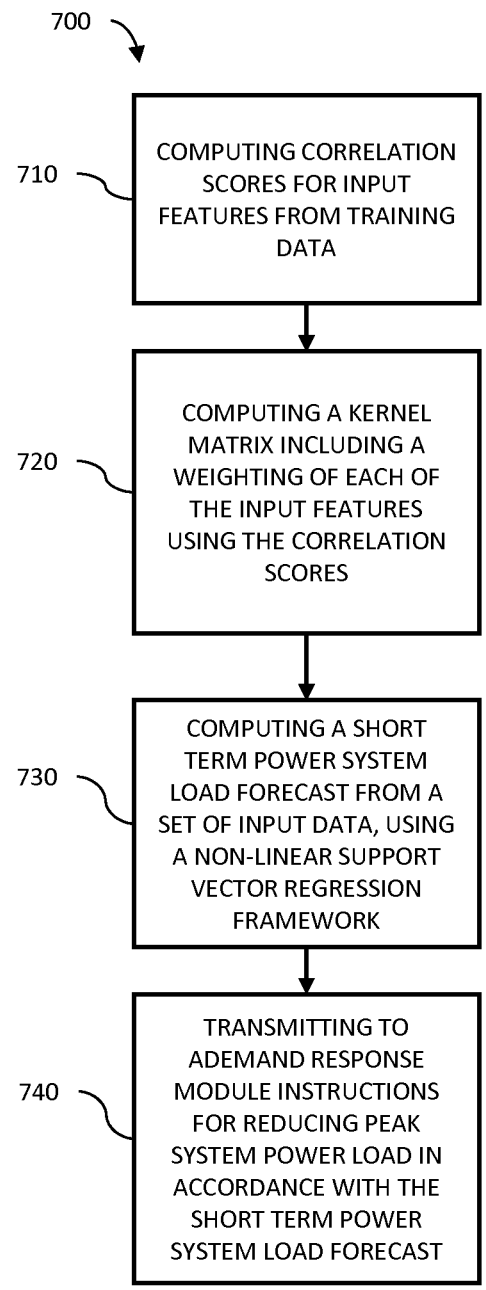
FIG. 7 is a flow chart showing a method in accordance with one embodiment of the invention.

An exemplary method 700 for reducing peak system power load using a demand response module in accordance with the invention is illustrated in FIG. 7. For a plurality of input features, a plurality of respective correlation scores are computed 710 using training data. Each of the correlation scores represents a strength of correlation between an input feature and the power system load. Using the training data, a kernel matrix is computed at 720. The kernel matrix defines mappings of the plurality of input features for use in a non-linear support vector regression framework. The kernel matrix includes a weighting of each of the plurality of input features using the respective correlation scores.

A short term power system load forecast is then computed 730 from a set of input data, using the non-linear support vector regression framework. Instructions are then transmitted 740 to the demand response module for reducing peak system power load, in accordance with the short term power system load forecast.

System

Figure 8:
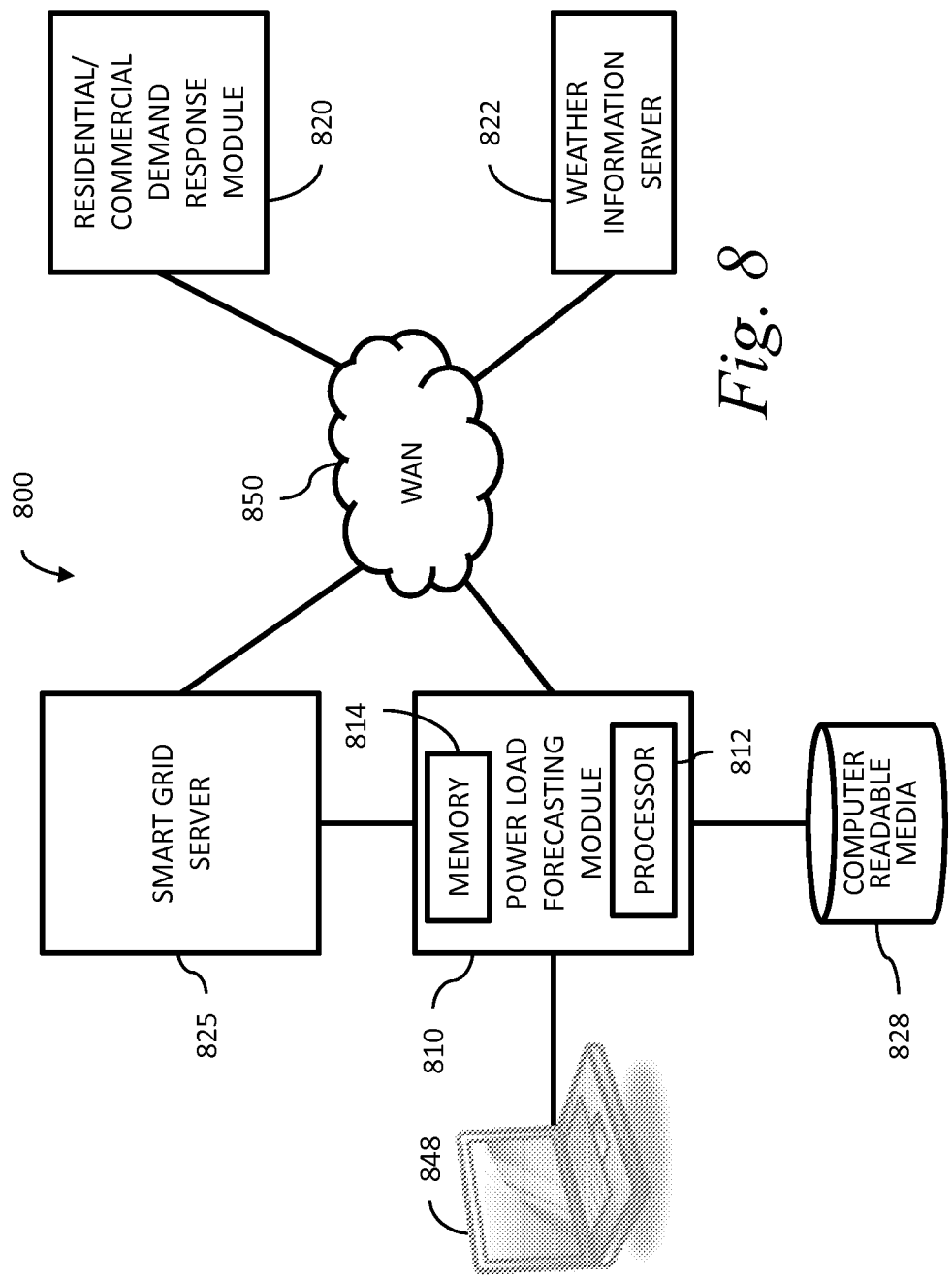
FIG. 8 is a schematic diagram showing a system in accordance with one embodiment of the invention.

The elements of the methodology as described above may be implemented in a computer system comprising a single unit or a plurality of units linked by a network or a bus. An exemplary system 800 is shown in FIG. 8.

A power load forecasting module 810 may be a mainframe computer, a desktop or laptop computer or any other device capable of processing data. The forecasting module 810 receives data from any number of data sources that may be connected to the module, including a wide area data network (WAN) 850. For example, the forecasting module 810 may receive data about environmental factors such as temperature, humidity and wind speed from a weather information server 822 connected to the forecasting module 810 through the WAN 850, or may receive prior load information from a smart grid server 825, or may receive input from a user via an input/output device 848. The input/output device includes an input that may be a mouse, network interface, touch screen, etc., and an output that may be a liquid crystal display (LCD), cathode ray tube (CRT) display, printer, etc. Alternatively, commands containing input/output data may be passed via the WAN 850. The forecasting module 810 can be configured to operate and display information by using, e.g., the input and output devices 848 to execute certain tasks.

The forecasting module 810 includes one or more processors 812 such as a central processing unit (CPU) and further includes a memory 814. The processor 812, when configured using software according to the present disclosure, includes modules that are configured for performing one or more methods for forecasting short-term power load or for reducing peak system power load using a demand response module, as discussed herein.

The memory 814 may include a random access memory (RAM) and a read-only memory (ROM). The memory may also include removable media such as a disk drive, tape drive, memory card, etc., or a combination thereof. The RAM functions as a data memory that stores data used during execution of programs in the processor 812; the RAM is also used as a program work area. The ROM functions as a program memory for storing a program executed in the processor 812. The program may reside on the ROM or on any other tangible or non-volatile computer-readable media 828 as computer readable instructions stored thereon for execution by the processor to perform the methods of the invention. The ROM may also contain data for use by the program or by other programs.

The power load forecasting module 810 provides power load forecasts to a smart grid server 825 that is interconnected to a power grid (now shown) through the WAN 850. Based on those forecasts, as well as other information, the smart grid server 825 computes and transmits commands to a residential or commercial demand response module 820 that resides in or near a home or industrial installation. The demand response module regulates power usage within the home or industrial installation in accordance with the commands. For example, in a case where an exceptionally high peak load is forecast, the smart grid server 825 may shave the peak system load by commanding the demand response module 820 to reduce or turn off power to certain appliances or machines at the time of the predicted peak load.

The above-described method may be implemented by program modules that are executed by a computer, as described above. Generally, program modules include routines, objects, components, data structures and the like that perform particular tasks or implement particular abstract data types. The term "program" as used herein may connote a single program module or multiple program modules acting in concert. The disclosure may be implemented on a variety of types of computers, including personal computers (PCs), hand-held devices, multi-processor systems, microprocessor-based programmable consumer electronics, network PCs, mini-computers, mainframe computers and the like. The disclosure may also be employed in distributed computing environments, where tasks are performed by remote processing devices that are linked through a communications network. In a distributed computing environment, modules may be located in both local and remote memory storage devices.

An exemplary processing module for implementing the methodology above may be hardwired or stored in a separate memory that is read into a main memory of a processor or a plurality of processors from a computer readable medium such as a ROM or other type of hard magnetic drive, optical storage, tape or flash memory. In the case of a program stored in a memory media, execution of sequences of instructions in the module causes the processor to perform the process steps described herein. The embodiments of the present disclosure are not limited to any specific combination of hardware and software and the computer program code required to implement the foregoing can be developed by a person of ordinary skill in the art.

The term "computer-readable medium" as employed herein refers to any tangible machine-encoded medium that provides or participates in providing instructions to one or more processors. For example, a computer-readable medium may be one or more optical or magnetic memory disks, flash drives and cards, a read-only memory or a random access memory such as a DRAM, which typically constitutes the main memory. Such media excludes propagated signals, which are not tangible. Cached information is considered to be stored on a computer-readable medium. Common expedients of computer-readable media are well-known in the art and need not be described in detail here.

CONCLUSION

A short term load forecast method is disclosed in which support vector regression is enhanced using feature-reweighting schemes. The target alignment is used to compute the scores of the features, which reflects the importance of each feature in predicting the target labels.

The foregoing detailed description is to be understood as being in every respect illustrative and exemplary, but not restrictive, and the scope of the disclosure herein is not to be determined from the description, but rather from the claims as interpreted according to the full breadth permitted by the patent laws. It is to be understood that various modifications will be implemented by those skilled in the art, without departing from the scope and spirit of the disclosure.

What is claimed is:

1. A method for forecasting short term power system load in a power supply system, comprising:
   by a processor, for a plurality of input features, computing a plurality of respective correlation scores using training data, each correlation score representing a strength of correlation between an input feature and the power system load;
   by a processor, computing, using the training data, a kernel matrix defining mappings of the plurality of input features for use in a non-linear support vector regression framework, the kernel matrix including a weighting of each of the plurality of input features using the respective correlation scores; and
   by a processor, computing a short term power system load forecast from a set of input data, using the non-linear support vector regression framework.

2. A method as in claim 1, wherein the kernel matrix comprises a Gaussian radial basis function.

3. A method as in claim 2, wherein, for input training data $X \in R^{n \times d}$ having an $i^{th}$ feature denoted by $X_{:,i}$ and for a target variable denoted by $Y \in R^{n \times 1}$, a correlation score for the $i^{th}$ feature is computed as $f_i = |\langle X_{:,i}, Y \rangle|$, and for a pair of the training samples $x_i, x_j \in R^{D \times 1}$ the kernel matrix is computed as $$K(x_i, x_j) = \exp\left(-\frac{\sum_{d=1}^{D} f_d^2(x_i(d) - x_j(d))^2}{2h^2}\right)$$

where h is an averaged pairwise distance between samples.

4. A method as in claim 1, wherein the plurality of input features includes ambient outside temperature.

5. A method as in claim 1, wherein the plurality of input features includes recent load history.

6. A method as in claim 5, further comprising:
   embedding the load history in a three-dimensional state space.

7. A method as in claim 5, further comprising:
   preprocessing the load history to compute daily load sums.

8. A method as in claim 1, wherein the plurality of input features include at least one feature selected from the group consisting of humidity, wind speed, dew point and air pressure.

9. A method for reducing peak system power load using a demand response module, comprising:
   by a processor, for a plurality of input features, computing a plurality of respective correlation scores using training data, each correlation score representing a strength of correlation between an input feature and the power system load;
   by a processor, computing, using the training data, a kernel matrix defining mappings of the plurality of input features for use in a non-linear support vector regression framework, the kernel matrix including a weighting of each of the plurality of input features using the respective correlation scores;
   by a processor, computing a short term power system load forecast from a set of input data, using the non-linear support vector regression framework; and
   transmitting to the demand response module instructions for reducing peak system power load in accordance with the short term power system load forecast.

10. A method as in claim 9, wherein the kernel matrix comprises a Gaussian radial basis function.

11. A method as in claim 10, wherein, for input training data $X \in R^{n \times d}$ having an $i^{th}$ feature denoted by $X_{:,i}$ and for a target variable denoted by $Y \in R^{n \times 1}$, a correlation score for the $i^{th}$ feature is computed as $f_i = |\langle X_{:,i}, Y \rangle|$, and for a pair of the training samples $x_i, x_j \in R^{D \times 1}$ the kernel matrix is computed as $$K(x_i, x_j) = \exp\left(-\frac{\sum_{d=1}^{D} f_d^2(x_i(d) - x_j(d))^2}{2h^2}\right)$$

where h is an averaged pairwise distance between samples.

12. A method as in claim 9, wherein the plurality of input features includes ambient outside temperature.

13. A method as in claim 9, wherein the plurality of input features includes recent load history.

14. A non-transitory computer-readable medium having stored thereon computer readable instructions for forecasting short term power system load in a power supply system, wherein execution of the computer readable instructions by a processor causes the processor to perform operations comprising:
  for a plurality of input features, computing a plurality of respective correlation scores using training data, each correlation score representing a strength of correlation between an input feature and the power system load;
  computing, using the training data, a kernel matrix defining mappings of the plurality of input features for use in a non-linear support vector regression framework, the kernel matrix including a weighting of each of the plurality of input features using the respective correlation scores; and
  computing a short term power system load forecast from a set of input data, using the non-linear support vector regression framework.

15. A non-transitory computer-readable medium as in claim 14, wherein the kernel matrix comprises a Gaussian radial basis function.

16. A non-transitory computer-readable medium as in claim 15, wherein, for input training data $X \in R^{m \times d}$ having an $i^{th}$ feature denoted by $X_{:,i}$ and for a target variable denoted by $Y \in R^{m \times 1}$, a correlation score for the $i^{th}$ feature is computed as $f_i = |\langle X_{:,i}, Y \rangle|$, and for a pair of the training samples $x_i, x_j \in R^{D \times 1}$ the kernel matrix is computed as $$K(x_i, x_j) = \exp\left(-\frac{\sum_{d=1}^{D} f_d^2(x_i(d) - x_j(d))^2}{2h^2}\right)$$

where h is an averaged pairwise distance between samples.

17. A non-transitory computer-readable medium as in claim 14, wherein the plurality of input features includes ambient outside temperature.

18. A non-transitory computer-readable medium as in claim 14, wherein the plurality of input features includes recent load history.

19. A non-transitory computer-readable medium as in claim 18, the operations further comprising:
  embedding the load history in a three-dimensional state space.

20. A non-transitory computer-readable medium as in claim 18, the operations further comprising:
  preprocessing the load history to compute daily load sums.

* * * * *